(12) United States Patent
Sarhan

(10) Patent No.: US 9,313,463 B2
(45) Date of Patent: Apr. 12, 2016

(54) AUTOMATED VIDEO SURVEILLANCE SYSTEMS

(75) Inventor: Nabil J. Sarhan, Dearborn, MI (US)

(73) Assignee: Wayne State University, Detroit, MI (US)

( * ) Notice: Subject to any disclaimer, the term of this patent is extended or adjusted under 35 U.S.C. 154(b) by 708 days.

(21) Appl. No.: 13/376,392

(22) PCT Filed: Jun. 9, 2010

(86) PCT No.: PCT/US2010/037958
§ 371 (c)(1),
(2), (4) Date: Feb. 11, 2012

(87) PCT Pub. No.: WO2010/144566
PCT Pub. Date: Dec. 16, 2010

(65) Prior Publication Data
US 2012/0133774 A1    May 31, 2012

Related U.S. Application Data

(60) Provisional application No. 61/185,452, filed on Jun. 9, 2009.

(51) Int. Cl.
*H04N 7/18* (2006.01)
*G08B 13/196* (2006.01)

(52) U.S. Cl.
CPC .......... *H04N 7/181* (2013.01); *G08B 13/19645* (2013.01); *G08B 13/19656* (2013.01); *H04N 7/185* (2013.01)

(58) Field of Classification Search
CPC ............... H04N 21/64769; G06K 9/00771; G06T 2207/30232
USPC ................................................. 348/143–160
See application file for complete search history.

(56) References Cited

U.S. PATENT DOCUMENTS

| | | | |
|---|---|---|---|
| 7,839,926 B1 * | 11/2010 | Metzger et al. | 375/240.01 |
| 2003/0081836 A1 | 5/2003 | Averbuch et al. | |
| 2004/0130620 A1 * | 7/2004 | Buehler et al. | 348/143 |
| 2005/0018766 A1 | 1/2005 | Iwamura | |
| 2006/0187895 A1 | 8/2006 | Nandagopalan | |
| 2007/0122003 A1 | 5/2007 | Dobkin et al. | |
| 2007/0133989 A1 | 6/2007 | Kim et al. | |

(Continued)

OTHER PUBLICATIONS

International Search Report dated Jul. 19, 2010 from corresponding PCT/US2010/037958 filed Jun. 9, 2010, 2 pgs.

*Primary Examiner* — Andy Rao
(74) *Attorney, Agent, or Firm* — Brooks Kushman P.C.

(57) ABSTRACT

A video surveillance system includes a plurality of video sources, at least one processing server in communication with the video sources, and at least one monitoring station viewing video from the video sources. The video sources are distributed over a target area to be monitored by the surveillance system and are attached to a video network. The processing server allocates bandwidth to the video sources with an accuracy function which provides event/object detection accuracy as a function of image/video quality transferred over the network. The image accuracy is the accuracy with which the processing server identifies features in a video image. Bandwidth is allocated by optimizing the overall event/object detection accuracy by adjusting image/video quality for each video source optionally subject to the dynamic network conditions experienced by each video source.

26 Claims, 4 Drawing Sheets

(56) References Cited

U.S. PATENT DOCUMENTS

2008/0069201 A1* 3/2008 Zhu et al. .................. 375/240.1
2009/0232203 A1* 9/2009 Jayant et al. ............. 375/240.02
2009/0254960 A1* 10/2009 Yarom et al. .................. 725/115

* cited by examiner

AUTOMATED VIDEO SURVEILLANCE SYSTEMS

CROSS-REFERENCE TO RELATED APPLICATION

This application is the U.S. national phase of PCT Appln. No. PCT/US2010/037958 filed Jun. 9, 2010 which claims the benefit of U.S. provisional Ser. No. 61/185,452 filed Jun. 9, 2009, the disclosures of which are incorporated in their entirety by reference herein.

STATEMENT REGARDING FEDERALLY SPONSORED RESEARCH OR DEVELOPMENT

The invention was made with Government support under Grant No. CHE-0910475 awarded by the National Science Foundation. The Government has certain rights to the invention.

BACKGROUND OF THE INVENTION

1. Field of the Invention

In at least one aspect, the present invention is related to an improved video surveillance system.

2. Background Art

Increasing security concerns have provided an impetus for improved video surveillance systems. Security problems have emerged as a major concern regionally, nationally, and globally. Therefore, the interest in video surveillance has grown dramatically. Currently, video surveillance systems are primarily used as a deterrent and a forensic tool.

Recent advances in networking, video sensors, and networked video cameras have enabled the development of large-scale surveillance systems. Some organizations use video surveillance to facilitate real-time detection of suspicious activities. Some of the larger surveillance systems currently being deployed consist of hundreds or millions of cameras distributed over a wide area. These cameras are usually connected to a central monitoring location that is observed by trained personnel. Beside the prohibitive cost of such systems, many critical events may be undetected because humans cannot simultaneously monitor an arbitrarily large number of cameras. Automated video surveillance systems provide one solution to this problem. Such systems typically employ smart computer vision algorithms to detect suspicious activities and events. Automated video surveillance serves as an elegant and efficient approach for real-time detection of threats and for monitoring their progress and the effectiveness of any countermeasures.

The design of an automated, scalable, and massively distributed surveillance system has become a significant research endeavor. Many prior art surveillance systems focus on developing robust vision algorithms for the detection, tracking, and classification of objects and events. A relatively insignificant effort has been devoted to improving scalability and costs of video surveillance systems. The scalability-cost problem arises because increasing the coverage through employing additional video sources (i.e., networked cameras or video sensors) leads to increasing both the required bandwidth and the computational power to process all these video streams.

Accordingly, there is a need for improved technology for video surveillance systems.

SUMMARY OF THE INVENTION

The present invention solves one or more problems of the prior art by providing in at least one embodiment a video surveillance system. The video surveillance system includes a plurality of video sources, at least one processing server in communication with the video sources, and at least one monitoring station viewing video from the video sources. The video sources are distributed over a target area to be monitored by the surveillance system and are attached to a video network. The processing server allocates bandwidth to the video sources with an accuracy function which provides event/object detection accuracy as a function of image/video quality transferred over the network. The event/object detection accuracy is the accuracy with which the processing server identifies features in a video image. Bandwidth is allocated by optimizing the overall event/object detection accuracy by adjusting image/video quality for each video source optionally subject to the dynamic network conditions experienced by each video source. The processing servers receive video streams from the video sources. The servers process and filter the received video streams by executing one or more computer vision algorithms. They also control bandwidth by running dynamic bandwidth allocation protocols. Dynamic bandwidth allocation is based on potential threat level, placement of video sources, location importance, site map, accuracy functions of computer vision algorithms, and dynamic network behavior. The present embodiment advantageously alleviates the scalability-cost and power consumption problems of large-scale surveillance systems.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "location importance", "location importance level", or "location-based sensitivity factor" as used herein means a quantification by an operator, committee, or other person regarding the value of a location or site.

The term "threat level" as used herein means a quantification by an operator, committee, or other person regarding the significance of a threat (e.g., a face matching any person or a specific person in a watch list, a vehicle in certain areas, a vehicle with a specific license plate number, fire, etc.).

Figure 1:
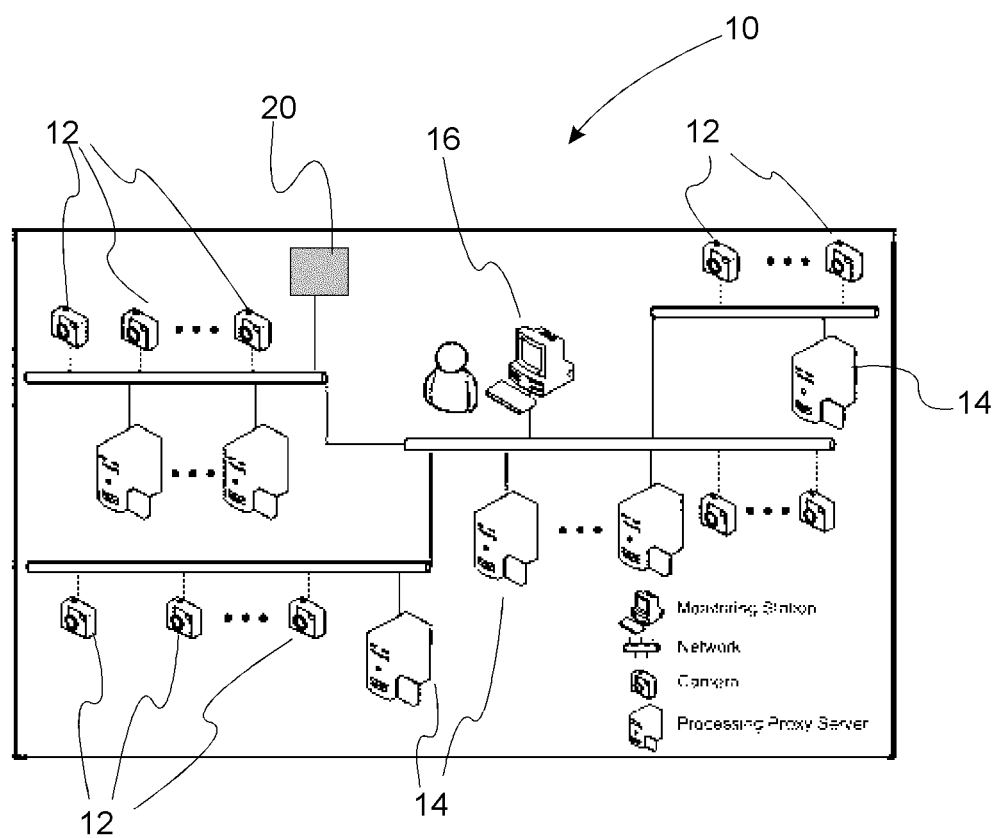
FIG. 1 is a schematic illustration of an embodiment of a video surveillance system.

With reference to FIG. 1, a video surveillance system is provided. The video surveillance system of this embodiment is a distributed, automated system. Video surveillance system 10 includes the following nodes: plurality of video sources 12, processing servers 14, and one or more monitoring stations 16. Typically, the video sources 12 are video sensors or networked cameras that are distributed over a large area, each of which monitors a location (i.e., a target). Examples of suitable video sources include, but are not limited to, inexpensive wired cameras, wireless cameras, and pan/tilt/zoom (PTZ) cameras. In a refinement, the more expensive high performance cameras (e.g., higher resolution, higher frame rate, etc) are used at critical or sensitive locations while cheaper cameras are used at less important locations. Processing servers 14 receive video streams from the video sources 12. The servers 14 process and filter the received video streams by executing one or more computer vision algorithms and control various associated video sources by running dynamic bandwidth allocation protocols. They also help in archiving the received video streams. Dynamic bandwidth allocation is based on potential threat level (increased threat level increased bandwidth allocated for a video source), placement of video sources, location importance, site map, accuracy functions of computer vision algorithms, and dynamic network behavior. The vision algorithms detect, track, and classify objects. In this regard, the prior art vision algorithms may be utilized. The dynamic bandwidth allocation protocols in part use the results of the vision algorithm to allocate the bandwidth. Processing servers 14 and monitoring stations 16 are usually computer systems with associated computer processors (e.g., CPUs), computer memory and data storage capacities. Processing servers 14 include a digital storage medium with one or more components of the vision algorithms and dynamic bandwidth allocation protocols implemented therein.

Still referring to FIG. 1, users at monitoring stations 16 are alerted when a suspicious event occurs. The occurrence of a suspicious event triggers a change in bandwidth allocations so that video sources associated with locations relevant to the event receive more bandwidth. Processing servers 14 execute a video streaming software package such as Apple's open-source Darwin Streaming Server software to stream videos to the monitoring stations 16. Video surveillance system 10 is adapted to deliver a large number of concurrent video streams to potentially multiple monitoring stations and will adapt to the dynamic network conditions. Users at monitoring stations 16 are presented with a user interface. The user-interface for human observers is an important design aspect. It should promote human focus by avoiding overcrowding. It should include a text box showing real-time alerts and other messages by the surveillance system. It should also include at least one video window, which is dedicated to server-initiated video streams from potentially problematic locations.

In a variation of the present embodiment, users are able to control the received video streams. Moreover, video surveillance system 10 is able to deliver both live streams and pre-recorded content to monitoring stations 16, allowing the users to apply limited VCR-like interactive operations. This capability is useful since human observers may need to observe what happened in the recent past at a particular location, which has been flagged with a potential threat by the system. Advantageously, the system of this variation provides flexibility in adding and removing video sources and allows for cheap networked cameras or video sensors to be used because the video processing is done by dedicated computers (processing servers).

The system of the present embodiment has improved scalability partly because unnecessary information is filtered thereby reducing the number of streams that are sent to monitoring stations. The distributed architecture of the present embodiment allows cheap, basic cameras to be used instead of more advanced cameras with powerful embedded processing. The cost of video sources is an essential aspect, especially in situations where wide deployment is required. In the present embodiment, processing of video streams is accomplished using inexpensive PCs for the processing servers. This also offers much more flexibility and allows easy archiving of all video streams for later analysis (when an incident happens, etc.). For each location X, we need to provide all possible threats to be detected (vehicle detection, face detection, face recognition, motion detection, etc.) and their associated threat levels. To meet the I/O bandwidth requirements, the storage subsystem 20, which is in communication with servers 14 and/or monitoring system 16 is ideally an advanced storage system such as RAID (Redundant Array of Individual Disks).

In one variation of the present embodiment, an accuracy curve (i.e., function) associated with the computer vision algorithm is utilized by the dynamic bandwidth allocation protocol to reduce the bandwidth used by one or more video sources. In particular, this reduction in bandwidth is achieved by optimizing the overall event/object detection accuracy. Such optimization comprises adjusting image/video quality for each video source subject to the dynamic network conditions experienced by each video source. The role of these conditions is discussed below in more detail in association with cross layer optimization. In addition, threat level, placement of video sources, location importance, site map, accuracy functions of computer vision algorithms, and dynamic network behavior also play a role in determining the network conditions. In one refinement, the accuracy function is a rate-accuracy function and the image/video quality transferred over the network is characterized by the size of video data transferred per unit time. In a further refinement, the event/object detection accuracy is optimized by adjusting one or more video parameters selected from the group consisting of image resolution, frame rate, compression quantization and combinations thereof. It should be appreciated that setting the size of the video files being transferred by each video source is equivalent to setting the bandwidth allocation for that video source since the video is transmitted over the network. Similarly, setting the video parameters for a video source sets the size of the video files being transferred which in turn sets the bandwidth allocation. The impetus for the accuracy curve is as follows. The accuracy of a computer vision algorithm depends on video quality (spatial, temporal, and signal-to-noise ratio) generated by the source. Transfer rate and thus the required bandwidth increase with the quality.

The accuracy of a vision algorithm increases with quality. These curves help in deciding how to save bandwidth while not severely impacting the accuracy of the vision algorithms. The accuracy curves are experimentally determined for a target area (i.e. site) to be monitored by video surveillance system 10. Such curves are modeled by a mathematical function with parameters defining the curves (e.g., polynomials, exponentials, etc.). In general, these parameters are stored on processing servers 14 and/or monitoring system 16 to be used by the bandwidth allocations protocols to determine the transfer rate for each video source. These curves help in deciding how to save bandwidth while not severely impacting the accuracy of the vision algorithms. For example, the bandwidth may be set to optimize the event/object detection accuracy while taking into account the complications due to the variability in the network conditions experienced by various video sources and the changes in these conditions with time, even for the same source. Therefore, a cross-layer optimization solution is provided and will be discussed later in this document (but in a more general setting and incorporating further refinements).

Figure 2:
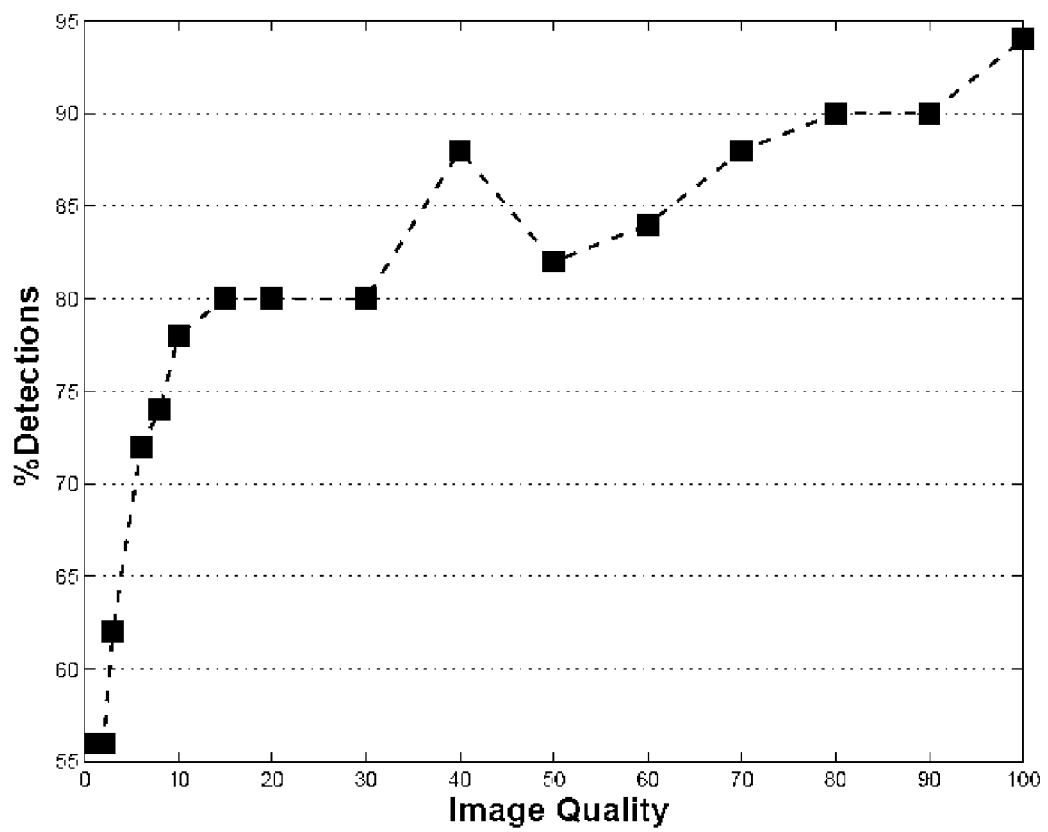
FIG. 2 is an example of a rate accuracy curve.
Figure 3:
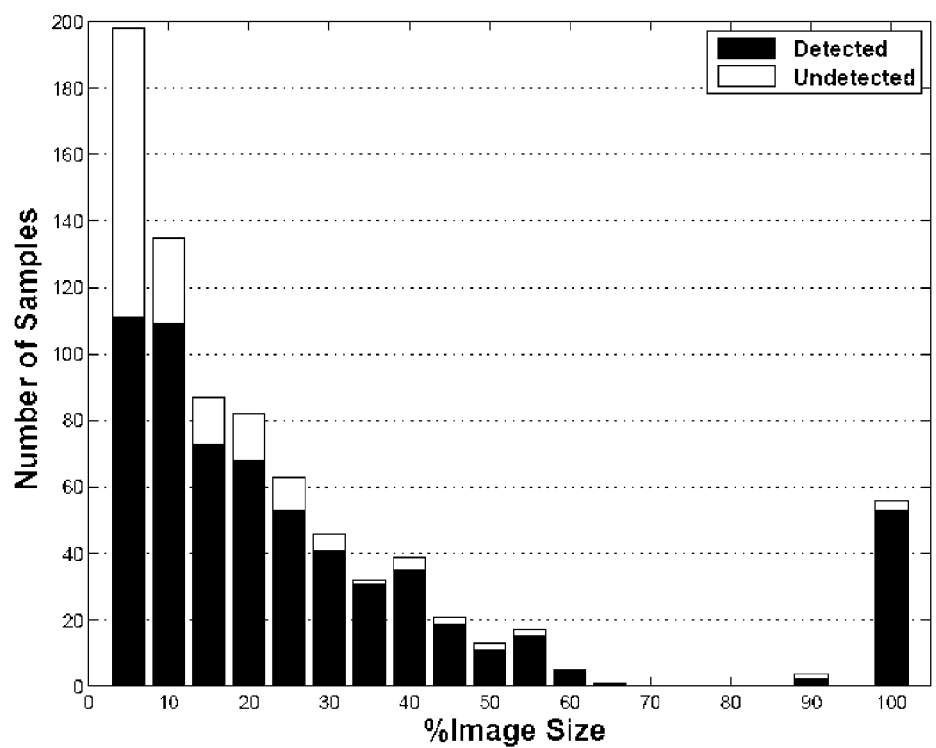
FIG. 3 is a bar chart demonstrating the impact of the reduction in the image size on object detection accuracy.

FIG. 2 provides an example of a rate accuracy curve formed from a set of encoded images, each at 16 different JPEG quality levels, ranging from 1 to 100. The highest compression ratio is achieved when the quality level is 1. The Viola-Jones algorithm was run on these samples. FIG. 2 shows the impact of image quality on the accuracy of face detection. (The peak at level 40 is due to the nature of the images used and the limited number of samples.) FIG. 2 shows that the detection accuracy keeps increasing with the image quality. Therefore, a gain in detection accuracy will continue to be achieved by increasing the image quality, but after a certain quality level (15 in these experiments), the accuracy increases at a relatively low rate. The 80% at that point may be reasonable in non-critical locations and when the current threat level is not high, but in some other locations and situations, higher accuracy rates are expected. FIG. 3 demonstrates the impact of the reduction in the image size on detection accuracy. Each bar shows the detection and failed detection frequencies at a specified 5% range. Most samples have sizes within 25% of their corresponding original images. The higher the size of an image compared to the original, the higher the required bandwidth and the better achieved accuracy.

In another variation of the present invention, the bandwidth allocation protocols depend on the locations within a site. The locations within a site have differing importance. The importance is related to a location's designated level of security. Other locations may not be very important by themselves but having a suspicious event (such as intrusion) in them may be used to predict a later problem in a more important location. The site map describes how one can get from one location to another within the site. For example, to get to location Z, one needs to get to location X and then location Y. In the present variation, the video surveillance system gives higher transfer rates to the video sources in location X than Y and higher rates to the sources in Y than Z. When a potential threat is detected in location X, the rates for the sources in location Y and probably Z increase. In a refinement, the allocation scheme considers cases when an unexpected break-in happens (for example in location Y without going through X). Moreover, the schemes will balance the increased computational costs associated with transferring higher quality images.

In another variation, the bandwidth allocation protocols capture situations when the same object is being tracked by more than one video source. In a refinement, only one of the sources is selected to transmit the video stream to save bandwidth, power, and computational costs. The selection of which video source transmits depends on the overlap of the area observed by each video source. Data association and target identity management are integrated to reduce the chances for target-swapping. Target management improves the data association accuracy by associating target identities with the state estimates (i.e., the conditions associated with each target) available at every instant. The present embodiment exploits the energy levels of various video sources when assigning only one video source to a target and avoiding the transmission of the captured video streams of the target by the nearby sources.

Optimal bandwidth allocation takes into consideration a potential threat level, placement of video sources, location importance, site map, accuracy curves of vision algorithms, and dynamic network conditions. In a refinement, input from non-video sensors (e.g., smoke detection, motion sensors, glass-break sensors, window and door sensors, etc.) is considered in the bandwidth allocation to assist in prioritizing the video sources with respect to the occurrence of a potential threat at a location.

In another refinement, an overall warning level is determined over a predetermined time period by deploying "statistical aggregation" of the potential threats detected. This aggregation considers the levels of sensitivity of the potential threats, the distribution of these threats over time, the importance of the locations where they are detected, and their closeness to other important locations.

When a potential threat is detected, the transfer rates for the video sources in that location and the locations directly connected to that location will all be increased appropriately. One potential threat may not warrant a strong warning and subsequent immediate action. When this warning, however, is followed by other potential threats, for example, in locations leading to a very sensitive location, then a strong warning must be sent.

Figure 4A:
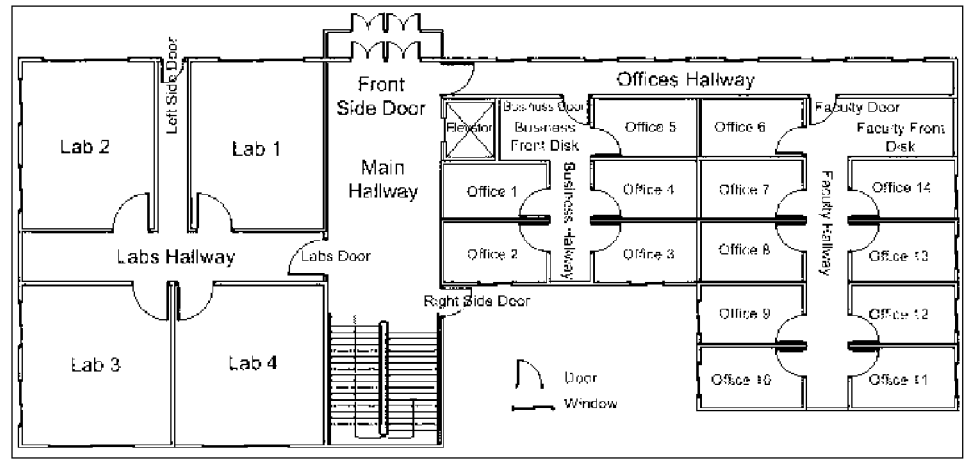
FIG. 4A is a site map that can be used in connection with the video surveillance system of FIG. 1.
Figure 4B:
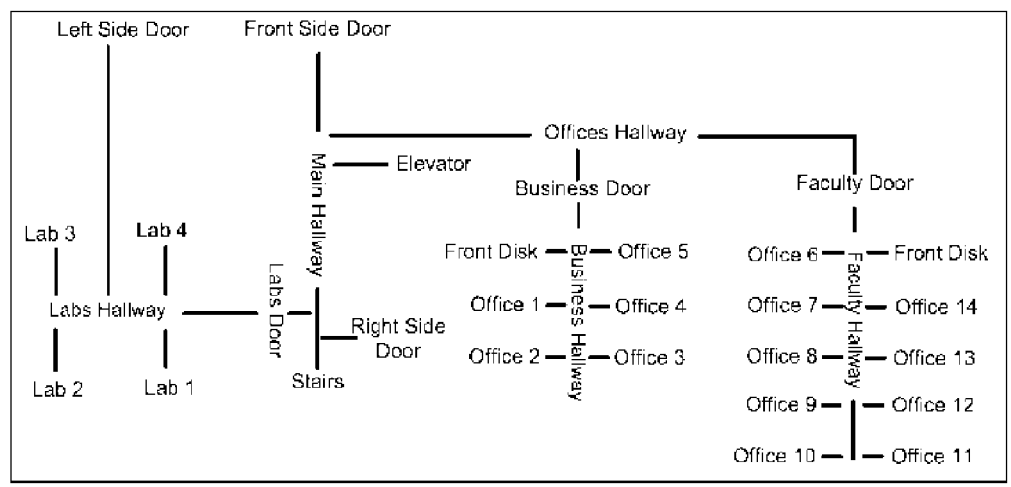
FIG. 4B is a simpler and more manageable view of the site-map of FIG. 4A, which can be used to assist in developing a computer representation.

The present embodiment exploits information regarding the placement of video sources, location importance, and site map. FIG. 4A provides an example of a site map that can be used in connection with the video surveillance system. FIG. 4B shows a simpler and more manageable view of the sitemap that can be used to assist in developing a computer representation. The site map provides critical information on how one can get from one location to another. In one refinement, the site map is represented as a graph data structure. The nodes in the graph are annotated with information regarding the location importance, whether a video source is currently placed at a given location, and if so, its specific placement within the location and orientation. As will be discussed later, the edges in the graph represent the distances between adjacent locations.

In another variation of the present embodiment, the dynamic bandwidth allocation protocol uses a cross-layer optimization method to optimize bandwidth utilization. This method controls parameters in more than one layer in the network stack. In particular, the method of the present embodiment optimizes parameters in the following layers: application, link, and physical. The application layer determines the video encoding rate. The physical layer is modeled by the data rate of the channel between the video source and the base station. The link layer coordinates the access to the shared wireless medium among various video sources by allocating the optimal share of bandwidth to each video source so that the total bandwidth does not exceed the link capacity. By using the physical channel rate and the link layer parameters, the algorithm determines the share of bandwidth for each video source. The bandwidth allocation protocol formulates the bandwidth allocation problem as a cross-layer optimization problem of the sum of the weighted event detection accuracy (or alternatively the sum of the weighted detection error), subject to the constraint in the total available bandwidth. The algorithm uses accuracy curves generated for each video source in its designated location. The weights, called overall sensitivity weights, are assigned based on the potential threat level, placement of video sources, location importance, and site map. Therefore, these weights represent the overall importance levels of various video sources at the current time. The cross-layer approach controls parameters in different layers in the network stack to dynamically control the network resources. With this formulation, the problem can be solved using constrained optimization methods such as Lagranian relaxation techniques or other techniques, depending on the generated accuracy curves. Based on the developed accuracy curves, a closed-form solution may not be possible. In these cases, the problem can be solved numerically using constrained nonlinear optimization methods such as interior point, sequential quadratic programming (SQP), active set, and trust-region reflective. The solution determines the application layer and link layer parameters. In particular, the video encoding rate for each video source is found and the link-layer parameters such as the transmission opportunity duration limit or the transmission frequency parameters are found.

Another aspect of this invention is the assignment of overall sensitivity weights to various locations. Each location is assigned a weight, referred to as an overall sensitivity weight. As discussed earlier, this sensitivity weight is determined based on the potential threat level, placement of video sources, location importance, and site map. Therefore, the sensitivity weights represent the overall importance levels of various video sources at the current time. The sensitivity weight assignment can be done using the following schemes. The site map is represented using a graph data structure. In this graph, the vertices represent the different locations in the site, whereas the edges represent paths between locations. Each edge between two vertices is annotated by a distance, representing the minimum distance between the corresponding locations through this path. We devise a novel strategy to account for possible break-ins between adjacent locations. We define the distance between two adjacent locations, as the minimum of the normal distance and the break-in distance. The normal distance is the usual distance between two adjacent locations without any break-ins. We introduce the term break-in distance to specify the distance in the case of a break-in. We define the break-in distance as the minimum distance achieved by a break-in, multiplied by a difficulty factor. The difficulty factor is determined based on the strength of the separating structure. Strong separating structures (such as steel walls) have a larger difficulty factor than weak structures (such as glass windows). The graph with the associated distance and location importance information is entered by the operator through software with a certain user interface (graphical or command line). The overall sensitivity weight of location i, denoted as $osw_i$ is determined as the weighted mean of the location-based sensitivity factor ($LS_i$), site-based sensitivity factor ($SS_i$), location-based threat sensitivity factor ($LT_i$), and site-based threat sensitivity factor ($ST_i$):

$$osw_i = z_1 \times LS_i + z_2 \times SS_i + z_3 \times LT_i + z_4 \times ST_i,$$

$LS_i$ is an operator assigned location-based sensitivity factor quantifying the importance of location i.
$SS_i$ is a site-based sensitivity factor quantifying the importance of locations proximate to location i;
$LT_i$ is a location-based threat sensitivity factor quantifying the detected threat level at location i;
$ST_i$ is site-based threat sensitivity factor quantifying the detected threat level at locations proximate to location i; and
$z_1, z_2, z_3, z_4$ are predetermined factors quantifying the contribution of each sensitivity factor. Typically, $z_1, z_2, z_3, z_4$ total to 1 while varying from 0 to 1. Each one of the four sensitivity factors ranges from 0 to $N_s$ where $N_s$ is a predetermined number. The location-based sensitivity factor ($LS_i$) is the location importance supplied by the operator. Note that the location-based sensitivity factor for a particular location considers only the importance of that location itself and does not consider the importance of nearby locations. The importance of its nearby locations, however, should have an impact on that location. Recall that a location may not by itself be important but if it is close to other important locations, then it should be considered important (to a certain degree). We capture this fact by the second sensitivity factor: site-based sensitivity. The site-based sensitivity factor for a certain location considers the importance of all other locations in the site (or alternatively a subset of them within a certain distance from the location). Specifically, the site-based sensitivity factor can be found as the weighted mean of the location importance values of all other locations in the site. The weights in the weighted mean are based on the distances from the location, with closer locations contributing more to the weighted mean. Therefore, site-based sensitivity for location i can be determined as follows:

$$SS_i = \sum_j LS_j \times \frac{1/d_j}{\sum_j 1/d_j} = \frac{1}{\sum_j 1/d_j} \sum_j LS_j \times \frac{1}{d_j},$$

where j is a number indexing locations in the site except location i (therefore, the summation is over every location j in the site except for location i) and $d_j$ is the distance from location i to location j. Although generally unnecessary except for extremely large and/or dense sites, it is possible to limit the sum to only those locations within a specified distance from the location for which we seek to find the site-based sensitivity factor.

The location-based threat sensitivity factor is based on the detected threat level in a particular location. The threat level is based on the event or object being detected, the time of detection, and the location. These events/objects may include a detected face, a face recognized to match a person in the watch list, a face recognized to match a person in the trusted personnel list (in this case, there is no threat), a truck, etc. The operator provides a detailed list of events and objects and their associated threat levels during different times and in different locations. The operator also provides a threshold value of the accuracy of detection below which the object/event is not considered to be threatening. In certain cases, it may be desirable to assess the threat level as the result of its multiplication with the associated threat detection accuracy.

The site-based threat sensitivity factor for a certain location considers the threats levels in other locations in the site, their detection accuracies, and their closeness to that location. If a threat is detected far away from a certain location, that threat will not significantly impact the threat level of the location. If that location, however, is close to other locations that have high threats, then the site-based threat sensitivity factor for that location will be high. The site-based threat sensitivity factor can be determined as the weighted mean of the threat levels in other locations. The weights in the weighted mean are based on the distances of these locations from the location for which we seek to find the site-based threat sensitivity factor:

$$ST_i = \sum_j LT_j \times \frac{1/d_j}{\sum_j 1/d_j} = \frac{1}{\sum_j 1/d_j} \sum_j LT_j \times \frac{1}{d_j},$$

where j is a number indexing locations in the site except location i (therefore, the summation is over every location j in the site except for location i) and $d_j$ is the distance from location i to location j. Although generally unnecessary except for extremely large or dense sites, it is possible to limit the sum to only those locations within a certain distance from the location for which we seek to find the site-based threat sensitivity factor.

As mentioned earlier, the overall sensitivity weight of location i, denoted as $w_i$, is determined as the weighted mean of the location-based sensitivity factor ($LS_i$), site-based sensitivity factor ($SS_i$), location-based threat sensitivity factor ($LT_i$), and site-based threat sensitivity factor ($ST_i$). The weights in this weighted mean ($z_1$, $z_2$, $z_3$, and $z_4$) are configurable parameters. Ideally, $z_1$ must be greater than $z_2$ since the importance of the location itself is more important than the importance of its nearby locations. Similarly, $z_3$ must be greater than $z_4$ since the threat detected in the location itself is more important than threats detected in its nearby locations.

In some variations, bandwidth, power, and computational cost are minimized by assigning one video source to tracking an object. In a refinement, the video surveillance system exploits the energy levels of various video sources when assigning one video source to a target when multiple sources are available to track the target. In addition, a pruning mechanism for further energy savings is utilized. This mechanism utilizes information regarding the remaining energy in each video source, its current overall importance, and the overall threat level. Specifically, after the rates are determined, a novel pruning mechanism is used to adjust (reduce) the bandwidth of the video sources if the anticipated loss in accuracy is below a certain threshold. This pruning is done for each video source. The threshold is a function of the remaining battery energy in the video source, its overall importance at that time (i.e., overall sensitivity weight), and the overall threat level. The pruning process helps reduce power consumption and thus increases the battery lifetimes of various video sources. For example, bandwidth for a particular video source may be reduced when its remaining battery level is low, especially, if the source is determined not to be very important at that time.

Without loss of generality, the following example illustrates how the dynamic bandwidth allocations are done for the IEEE 802.11e Wireless Local Area Network (WLAN), with the Enhancement Distributed Channel Access (EDCA) mode. In this example, all video sources share the same medium: IEEE 802.11e. The bandwidth allocation algorithm in this case will determine the fraction of airtime that each one of these sources will receive. Obviously, the total of their airtimes cannot exceed the effective airtime of the medium (which can be defined as the airtime when useful data are transmitted without any collisions, due to more than one simultaneous transmission).

The bandwidth allocation algorithm formulates the problem as a cross layer optimization problem of the sum of the weighted event detection error. In a refinement, the bandwidth allocation for each video source in the plurality of video sources is determined by finding the optimal video data rate for each video source that minimizes the total weighted event/object detection error ($\sum_{s=1}^{S} w_s (1-\text{accuracy}_s(r_s))$), where $r_s$ is the application layer transfer rate for video source s, S is the number of video sources, and $w_s$ is the weight for video source s indicating its current overall importance. In another refinement, the bandwidth allocation for each video source in the plurality of video sources is determined by finding the optimal video data rate for each video source that minimizes the total weighted event/object detection error $\sum_{s=1}^{S} w_s (1-\text{accuracy}_s(vp_s))$ where $vp_s$ is video quality parameters for video source s, S is the number of video sources, and $w_s$ is the weight for video source s indicating its current overall importance. In yet another refinement, the bandwidth allocation for each video source in the plurality of video sources is determined by finding the optimal fraction of the airtime ($f_s^*$) for each video source that minimizes the total weighted event/object detection error ($\sum_{s=1}^{s} w_s (1-\text{accuracy}_s(r_s))$), where $r_s$ is the application layer transfer rate for video source s, S is the number of video sources, and $w_s$ is the weight for video source s indicating its current overall importance. Note that the weight ($w_s$) for video source s is equal to the overall sensitivity weight ($osw_i$) for the location i where the video source s is placed. Thus, if video source s is placed in location i then $w_s = osw_i$. This optimization is subject to the following constraints:

Total air time of all video sources is less than the effective airtime of the medium (EA): $\sum_{s=1}^{S} f_s \leq EA$ The application layer transfer rate of source s is the product of the its airtime ($f_s$) and the physical layer transfer rate ($y_s$) for video source s: $r_s = f_s \times y_s$ The airtime of each source is between 0 and 1 (inclusive): $0 \leq f_s \leq 1$ The detection accuracy is between 0 and 1 (inclusive) $0 < \text{accuracy}_s(r_s) \leq 1$.

s=1, 2, 3, ..., S

The accuracy functions ($\text{accuracy}_s(r_s)$ and $\text{accuracy}_s(vp_s)$) are based on the generated accuracy curves. First, an accuracy curve is generated for each location, group of similar locations, or all locations in the surveillance site for each computer vision algorithm. Mathematical functions that best fit these curves are then determined. These functions are referred to as $\text{accuracy}_s(r_s)$ and $\text{accuracy}_s(vp_s)$ in the above formulations. The parameters of these functions are to be given to the dynamic bandwidth allocation algorithm in order to solve the optimization problem. Note that this formulation considers data from different layers in the network stack and thus is considered as a cross-layer approach.

With this formulation, the problem can be solved using Lagranian relaxation techniques or other techniques, depending on the generated rate-accuracy curves. Based on the developed rate-accuracy curves, a closed-form solution may not be possible. In these cases, the problem can be solved numerically using constrained nonlinear optimization methods such as interior point, sequential quadratic programming (SQP), active set, and trust-region reflective. The solution determines the application layer and link layer parameters. In particular, the video encoding rate (video transfer rate or video transfer bandwidth) for each video source is found. The pruning mechanism is then employed to potentially reduce these encoding rates to achieve further savings in energy. As discussed earlier, this mechanism operates on each video source separately. It reduces the allocated bandwidth as long as the expected loss in accuracy (determined using the pertaining accuracy curve) is below a certain threshold. The threshold depends on the remaining battery lifetime of the source, its current overall importance, and the overall threat level. The current overall importance is determined based on the location importance, the importance of locations proximate to it, and the specific threats detected. The current overall importance can be found using the aforementioned equation for overall sensitivity weight. The threshold is larger for a less important source with higher remaining battery level, leading to a higher reduction in bandwidth and thus a larger energy saving. Finally, the link-layer parameters are determined based on the allocated bandwidth or airtime to each video source. The link layer parameters enforce the bandwidth allocated to each video source. The link-layer parameters can either be the transmission opportunity duration limit (TXOP limit) or alternatively the frequency of the transmission opportunity. The control of the TXOP limit is more preferred since it is only one parameter, whereas the transmission frequency involves three parameters: arbitration inter-frame space (AIFS), minimum contention window size (CWmin), and maximum contention window size (CWmax).

In a variation of the present embodiment, the signal to noise ratio ("SNR"), spatial, and temporal scaling of the videos are optimized with respect to network bandwidth, processing, and power consumption. This video adaptation is achieved by scaling the video SNR, spatial, and/or temporal parameters. The SNR quality is controlled by changing the quantization parameter of the Discrete Cosine Transform (DCT) coefficients in MPEG-based or H-based codecs. The spatial and temporal qualities, however, are controlled by changing the frame size or frame rate, respectively. Video quality depends on three main parameters: image size (in pixels), frame rate (frames per second), and bit rate (megabits per second). Video adaptation may change any one or any combination of these parameters. The required bandwidth is directly related to the bit rate of the video source. The required processing at the server nodes includes video decoding and running the vision algorithm(s). MPEG decoding time depends on the image size and frame rate. The dependence on the image size is due to the fact that MPEG codecs generally divide each frame into N pixel×N pixel regions. Assuming that the image size is S, the frame rate is F, the required processing complexity at the nodes is given by $$C_{Comp} = C_{Decoding} + C_{Algorithm} = cd \times S \times F \times C_{OneImageAlgorithm}(S),$$

where $C_{Decoding}$ is the computational complexity of decoding, $C_{Algorithm}$ is the computational complexity of the vision algorithm(s), cd is a constant, and $C_{OneImageAlgorithm}$ is the complexity of the vision algorithm for only one image of the video. The bitrate B is a result of the compression. To a first approximation, the processing required by a vision algorithm depends on the frame size and frame rate. The power dissipation at the camera/sensor is due to video capturing, encoding, processing, and transmission. This power consumption greatly depends on the hardware and software optimization techniques used in the networked camera or video sensor. The aforementioned discussion shows that the required processing at the processing servers depends on the image size and frame rate but not the bit rate. To reduce the required processing, the image size and frame rate are controlled. The accuracy of the vision algorithms, such as face detection may be impacted more negatively by reducing the frame rate or image size than by reducing the bitrate through SNR scaling. In a refinement, digital zooming through Bicubic up-scaling enhances the accuracy of the vision algorithm. Note that many networked cameras allow the frame rate and picture size to be adjusted and their desired values are incorporated in the compression algorithm, thereby requiring no later adaptations.

Developing rate-accuracy curves is an essential part of dynamic bandwidth allocation. Power consumption in video surveillance cameras is attributed to image capture, encoding (compressing) the video, and data transfer. The power consumption generated by each of the these components increases with the bitrate. The main methods to control the bitrate and power consumption are by changing the image resolution, the frame rate, compression quantization parameters, and any combination of them. These methods are also called rate adaptation. The power consumption incurred by image capture depends on the used sensor in the camera (CMOS or CCD). The encoding depends on the encoding algorithm (such as MJPEG, MPEG-I, MPEG-II, MPEG-4, and H.264) and whether the encoding is done by software or hardware. Changing only the quantization parameters does not impact the power consumption incurred by image capture. Rate accuracy curves should be generated for a specific computer vision algorithm (such as face detection and face recognition, etc.), a specific video encoding algorithm, as well as a specific rate adaptation method. In each case, the accuracy of the computer vision algorithm is plotted versus the video rate and then a mathematical function is derived using appropriate curve fitting.

Alternatively, we can formulate the detection accuracy as a function of the resolution, frame rate, and quantization parameter and then solve the optimization problem to attain the optimal values of resolution, frame rate, and quantization parameter for each video source. The latter method is the best because it takes into consideration that the different factors impact the achieved bit rate and thus accuracy differently. It complicates, however, the solution for optimal bandwidth allocation and it may not be possible to find a closed-form solution. In that case, the problem can be solved numerically. Although the numeric solution will require additional computation, it will not increase the overall computation power significantly compared with the computer vision algorithms as it has lower computational complexity and does not have to be run frequently (only when significant changes in network or threat situations happen).

In other variations of the present embodiment, a number of fault tolerance methods are provided. In one aspect, the fault tolerance protocols ensure delivery of the video streams to the monitoring stations, which may be outside the surveillance site. The tolerance to any network or node (such as a router) failure is at least partially achieved by adopting path-diversity streaming techniques which deliver streams on multiple paths. However, a problem in the access point or a widespread problem in the Internet Service Provider (ISP) may not be prevented by these techniques. In these instances, multiple ISPs are concurrently utilized. Other techniques to improve fault tolerance, include but are not limited to, packet mirroring (sends every packet through each ISP), Group-of-Picture (GOP) Interleaving (sends successive GOPs of the video to alternate ISPs), and frame splitting (divides each frame into multiple subframes and sends different subframes through different ISPs.) Optimally, node failure does not impact the processing of any incoming video stream thereby avoiding undetected objects or events. At times, utilization of the bandwidth allocation methods set forth above results in the nodes becoming overloaded, especially when a threat is detected and higher bandwidth is assigned to video sources. Moreover, overload is expected when any processing node fails, and the other nodes take over. In one variation, the packets of individual streams are marked with priorities based on the assigned bandwidth to their corresponding sources. Therefore, when the system is overloaded, low priority packets can be dropped by the processing nodes and thus will not be analyzed. In a further refinement, the video surveillance system ensures that the video stream of any one source will not be denied processing for longer than a certain pre-specified time.

In still another variation of the present embodiment, one or more processing servers implement feature extraction protocols and continuous queries. As used herein, continuous queries are persistent queries that are issued once and then run continuously over live streams. Such queries enable administrators to specify and query any event or object that must be monitored continuously. Such queries may utilize the sitemap and location-importance information. For example, the following queries may be performed: "face or motion detected in room 2 or any of its neighbors" and "motion detected in location with importance higher than 2."

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A video surveillance system comprising:
  a plurality of video sources distributed over a target area to be monitored by the video surveillance system, the video sources attached to a video network;
  at least one processing server in communication with the video sources, the processing server allocating bandwidth to the video sources with an accuracy function, the accuracy function giving event or object detection accuracy as a function of image or video quality transferred over the video network, the event or object detection accuracy being an accuracy with which the processing server identifies features in an image or video, bandwidth being allocated by:
  a) optimizing overall event or object detection accuracy by adjusting image or video quality for each video source subject to dynamic network conditions experienced by each video source; and
  at least one monitoring station viewing video from the video sources.

2. The system of claim 1 wherein the accuracy function is a rate-accuracy function giving event or object detection accuracy as a function of the image or video bitrate transferred over the video network.

3. The system of claim 1 wherein the event or object detection accuracy is optimized by adjusting one or more video parameters selected from the group consisting of image resolution, frame rate, compression quantization and combinations thereof.

4. The system of claim 1 wherein the processing server is operable to reduce the image or video quality independently for each video source while maintaining the event or object detection accuracy to within a predetermined percent of an optimal value for each video source.

5. The system of claim 1 wherein the processing server processes and filters video streams received from the video sources.

6. The system of claim 1 wherein the video sources are selected from the group consisting of video sensors, cameras, and combinations thereof.

7. The system of claim 1 wherein the bandwidth for a particular video source is increased if a threat level associated with a video source increases.

8. The system of claim 1 wherein the processing servers and the monitoring stations are each independently computer systems having a computer processor, computer memory and data storage units.

9. The system of claim 1 wherein bandwidth allocation for each video source considers one or more factors selected from the group consisting of threat level, location of video sources, location importance, site map, dynamic network conditions, and combinations thereof.

10. The system of claim 1 wherein bandwidth allocated to each location i in the plurality of video sources is proportional to a weighting factor $osw_i$ given by the following formula:

$$osw_i = z_1 \times LS_i + z_2 \times SS_i + z_3 \times LT_i + z_4 \times ST_i$$

$LS_i$ is an operator assigned location-based sensitivity factor quantifying importance of location i;

$SS_i$ is a site-based sensitivity factor quantifying importance of locations proximate to location i;

$LT_i$ is a location-based threat sensitivity factor quantifying a detected threat level at location i;

$ST_i$ is site-based threat sensitivity factor quantifying the detected threat level at locations proximate to location i; and $z_1, z_2, z_3, z_4$ are predetermined factors quantifying a contribution of each sensitivity factors.

11. The system of claim 10 wherein $$SS_i = \sum_j LS_j \times \frac{1/d_j}{\sum_j 1/d_j} = \frac{1}{\sum_j 1/d_j} \sum_j LS_j \times \frac{1}{d_j}$$

j is a number indexing locations in a site except i; and
$d_j$ is a distance from location i to location j.

12. The system of claim 11 wherein $ST_i$ is determined from the following formula:

$$ST_i = \sum_j LT_j \times \frac{1/d_j}{\sum_j 1/d_j} = \frac{1}{\sum_j 1/d_j} \sum_j LT_j \times \frac{1}{d_j}.$$

13. The system of claim 1 wherein the processing server is operable to use a cross-layer optimization method to allocate bandwidth.

14. The system of claim 13 wherein a cross-layer optimization method adjusts parameters for an application layer, link layer, and physical layer.

15. The system of claim 14 wherein bandwidth allocation for each video source in the plurality of video sources is determined by finding an optimal video data rate for each video source that minimizes a total weighted event or object detection error ($\Sigma_{s=1}^{S} w_s(1-accuracy_s(r_s))$), where $r_s$ is an application layer transfer rate for video source s, S is the number of video sources, and $w_s$ is a weight for video source s indicating its current importance.

16. The system of claim 14 wherein bandwidth allocation for each video source in the plurality of video sources is determined by finding an optimal video data rate for each video source that minimizes a total weighted event or object detection error $\Sigma_{s=1}^{S} w_s(1-accuracy_s(vp_s))$ where $vp_s$ is video quality parameters for video source s, S is the number of video sources, and $w_s$ is a weight for video source s indicating its current importance.

17. The system of claim 14 wherein bandwidth allocation for each video source in the plurality of video sources is determined by finding an optimal fraction of the airtime ($f_s^*$) for each video source that minimizes a total weighted event or object detection error ($\Sigma_{s=1}^{S} w_s(1-accuracy_s(r_s))$), where $r_s$ is an application layer transfer rate for video source s, S is the number of video sources, and $w_s$ is a weight for video source s indicating its current importance.

18. The system of claim 17 wherein determination of the optimal fraction of airtime is subject to the following constraints:
    total air time of all video sources is less than an effective airtime of medium (EA): $\Sigma_{s=1}^{S} f_s \leq EA$;
    an application layer transfer rate of source s is a product of its airtime ($f_s$) and a physical layer transfer rate ($y_s$) for video source s: $r_s = f_s \times y_s$
    airtime of each source is between 0 and 1 (inclusive): $0 \leq f_s \leq 1$;
    detection accuracy is between 0 and 1 (inclusive) $0 < accuracy_s(r_s) \leq 1$; and
    s is from 1 to S.

19. The system of claim 1 wherein the processing server is operable to select a single video source when an object is tracked by more than one video source.

20. The system of claim 1 wherein the system receives input from non-video sources.

21. The system of claim 1 wherein bandwidth is allocated proportional to a sum of sensitivity weights for threat level, placement of video sources, location importance, and site map.

22. The system of claim 9 wherein detection accuracy of each video source is weighted by a weighting factor based on an operator assigned location-based sensitivity factor quantifying importance of its location, a site-based sensitivity factor quantifying importance of locations proximate to its location, a location-based threat sensitivity factor quantifying detected threat level at its location, and a site-based threat sensitivity factor quantifying detected threat level at locations proximate to it, and combinations thereof.

23. The system of claim 15 wherein the weight for each video source $w_s$ is set to an overall sensitivity weight $osw_i$ of its location i.

24. The system of claim 16 wherein the weight for each video source $w_s$ is set to an overall sensitivity weight $osw_i$ of its location i.

25. The system of claim 17 wherein the weight for each video source $w_s$ is set to an overall sensitivity weight $osw_i$ of its location i.

26. The system of claim 4 wherein reduction in bitrate of each video source is related to one or more factors selected from the group consisting of threat level, remaining battery energy or lifetime of the video source, importance of a location of the video source, importance of locations leading to that location, detected threats, events, or objects in that location, detected threats, events, or objects in locations leading to that location, site map, and combinations thereof.

* * * * *